W. H. HOLTBY.
CRACKED BOLL COTTON CLEANER.
APPLICATION FILED FEB. 19, 1907.
907,802.
Patented Dec. 29, 1908.
2 SHEETS—SHEET 1.
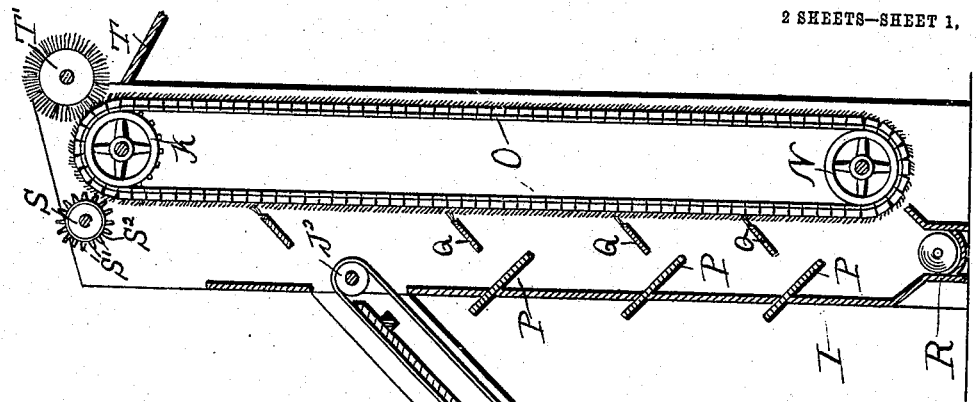
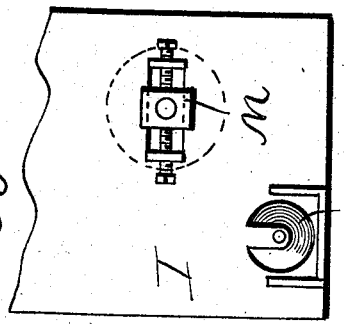
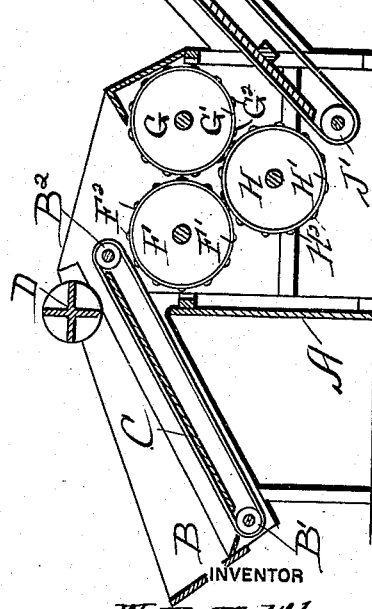
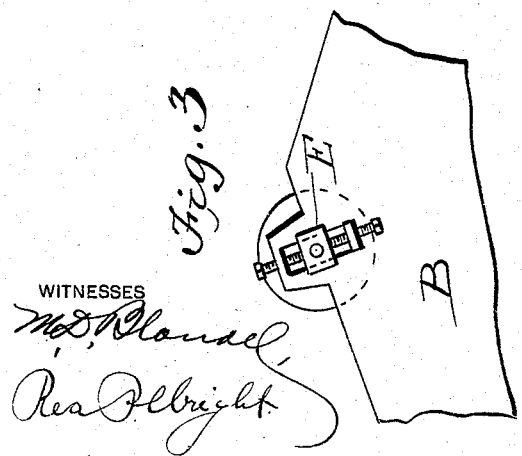
WITNESSES
INVENTOR
W. H. Holtby.
by Means & Broch
ATTYS.

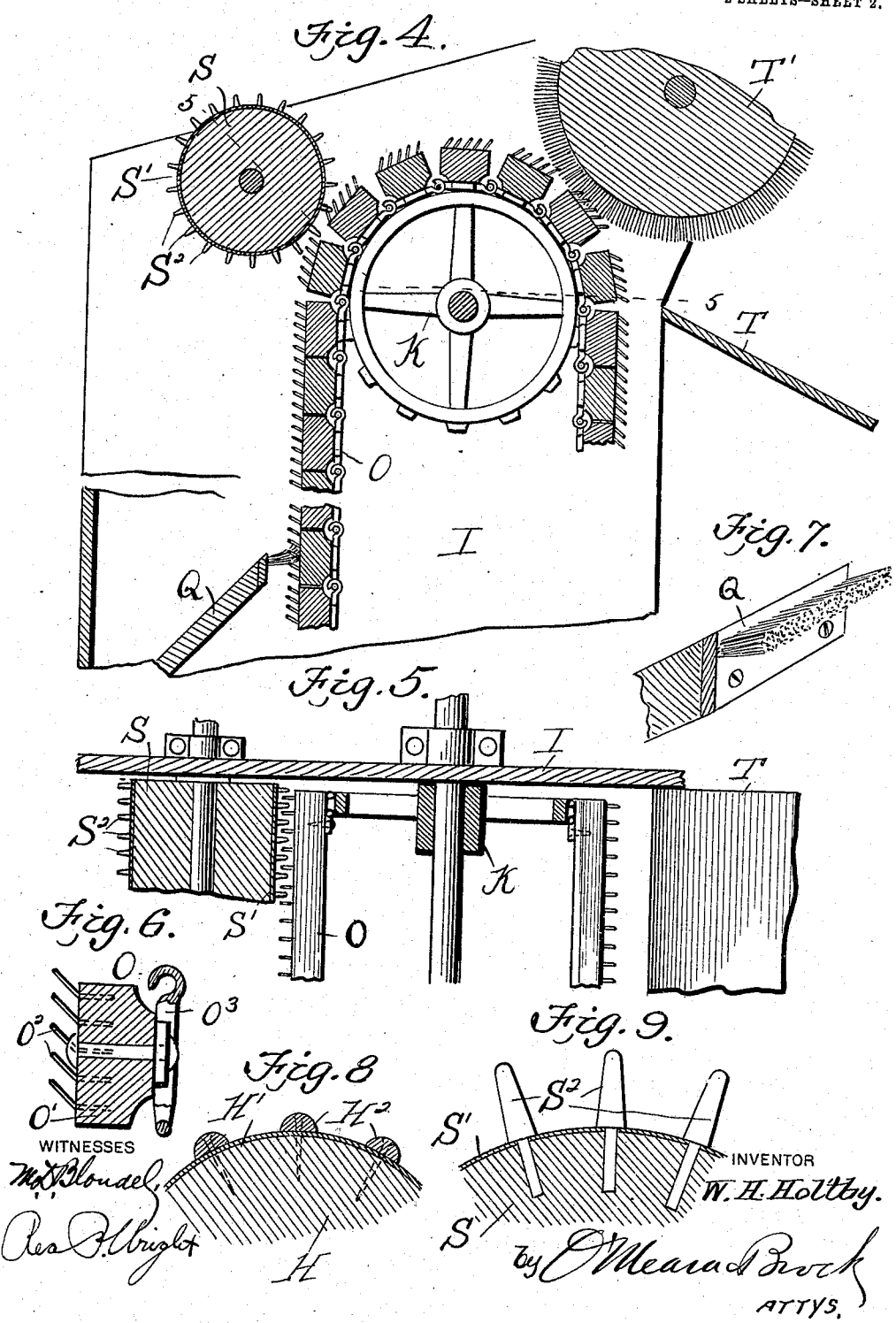

UNITED STATES PATENT OFFICE.

WILKIE H. HOLTBY, OF MARTHA, OKLAHOMA.

CRACKED-BOLL-COTTON CLEANER.

No. 907,802.     Specification of Letters Patent.     Patented Dec. 29, 1908.

Application filed February 19, 1907. Serial No. 358,249.

*To all whom it may concern:*

Be it known that I, WILKIE H. HOLTBY, a citizen of the United States, residing at Martha, in the county of Jackson and State of Oklahoma, have invented a new and useful Improvement in Cracked-Boll-Cotton Cleaners, of which the following is a specification.

This invention relates to a machine for cracking and cleaning cotton bolls, the object being to provide a machine in which the bolls can be placed and the cotton separated from them, thereby saving a great amount of cotton that hangs to the bolls and is ordinarily wasted.

Another object of my invention is to provide the machine with cracking rollers so that the bolls will be cracked into small pieces before they reach the saws.

Another object of my invention is to provide means for throwing the cracked bolls against the saw so that the seed cotton will be removed from the bolls before they pass out of the machine.

With these objects in view, the invention consists in the novel features of construction, hereinafter fully described and pointed out in the claims.

In the drawings forming a part of this specification:—Figure 1 is a longitudinal sectional view of the machine. Fig. 2 is a detail view of the adjustable bearing for the saw. Fig. 3 is a detail view of the adjustable bearing for the beater. Fig. 4 is a detail enlarged vertical sectional view of the upper end of the casing carrying the saw. Fig. 5 is a sectional view taken on lines 5—5 of Fig. 4. Fig. 6 is a sectional view of one of the links of the saw. Fig. 7 is a perspective view of one of the brushes. Fig. 8 is a detail enlarged sectional view of the cracking roller. Fig. 9 is an enlarged, detail sectional view of a saw cleaning roller.

Referring to the drawing A indicates a casing provided with a hopper B adapted to receive the bolls in which are mounted rollers $B'$, $B^2$, carrying an endless conveyer C, which is adapted to convey the bolls into the casing A. A beater D is mounted over the upper end of the conveyer C in adjustable bearings E, so that it can be adjusted to or away from the conveyer as desired.

Mounted in the casing A, are crushing rollers F, G, and H adapted to rotate at different rates of speed, provided with sheet metal coverings $F'$, $G'$, $H'$, having half-round ribs $F^2$, $G^2$ and $H^2$ secured therein so that the bolls will be broken into small pieces as they pass between the same. A casing I is arranged to one side of the casing A connected thereto by a spout $I'$, in which an endless conveyer J is arranged, passing over a roller $J'$ in the casing A, under the crushing rollers, and a roller $J^2$ in the casing I, and adapted to convey the broken bolls into the casing I from the crushing rollers.

Mounted in the upper end of the casing I is a sprocket wheel K and in the lower end is an adjustable bearing M in which are mounted sprocket wheels N, on which the gin saw O is mounted, which is formed of blocks $O'$ provided with teeth $O^2$ on their outer edges, and links $O^3$ secured on their inner edges by bolts, which are provided with a hook at one end and an eye at the other end adapted to be connected together, to form an endless saw. A series of inclined plates P are secured to the side of the casing I under the spout J, adapted to direct the broken bolls against the saw, the seed cotton being forced into the teeth of the saw by a series of brushes Q arranged in the casing over the plates. The pieces of bolls and trash drop down into a conveyer R, and are carried away. A roller S is mounted in the upper end of the casing having a sheet metal covering $S'$ provided with outwardly projecting pins $S^2$, adapted to remove any of the pieces of the bolls from the saw that may lodge in the seed cotton.

An ordinary cotton brush T is arranged on one side above the top of the saw adapted to remove the cotton from the saw and discharge the same through the chute.

From the foregoing description it will be readily seen that I have provided a machine so constructed that the boll can be placed therein whole and every particle of cotton removed from the same with the seed.

Having thus fully described my invention what I claim as new and desire to secure by Letters Patent is:—

1. In a cracked boll cotton cleaner, the combination with a casing carrying an endless saw, of inclined plates secured to one side of said casing, brushes arranged over said plates, and means for crushing cotton bolls and conveying them into said casing, for the purpose described.

2. In a cracked boll cotton cleaner, the combination with a casing carrying an endless saw, of inclined plates secured to one side of said casing, brushes arranged over said plates, means for adjusting said saw away from or toward the plates, and means for crushing cotton bolls and conveying the same into the casing for the purpose described.

3. In a cracked boll cotton cleaner, the combination with a casing, provided with a conveyer at its lower end, and a discharge opening at the upper end, of an endless saw mounted in said casing, inclined plates secured to one side of the casing, brushes arranged over said plates, a second casing, a conveyer between the casings, and crushing rollers in the last mentioned casing, for the purpose described.

WILKIE H. HOLTBY.

Witnesses:
   HORACE C. DOUGHTY,
   GEO. W. LEWIS.